US010212355B2

(12) United States Patent
Whitehouse et al.

(10) Patent No.: US 10,212,355 B2
(45) Date of Patent: Feb. 19, 2019

(54) DUAL-MODE ILLUMINATOR FOR IMAGING UNDER DIFFERENT LIGHTING CONDITIONS

(71) Applicant: THALES VISIONIX, INC., Clarksburg, MD (US)

(72) Inventors: William Whitehouse, Brentwood, NH (US); Eric Foxlin, Lexington, MA (US); Thomas Calloway, Dracut, MA (US); John Popoolapade, Bolingbrook, IL (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 330 days.

(21) Appl. No.: 15/052,712

(22) Filed: Feb. 24, 2016

(65) Prior Publication Data
US 2017/0026560 A1 Jan. 26, 2017

Related U.S. Application Data (60) Provisional application No. 62/133,138, filed on Mar. 13, 2015.

(51) Int. Cl.
*H04N 5/235* (2006.01)
*B64D 43/00* (2006.01)
(Continued)

(52) U.S. Cl.
CPC .......... *H04N 5/2352* (2013.01); *B64D 43/00* (2013.01); *H04N 5/2256* (2013.01);
(Continued)

(58) Field of Classification Search
CPC .................... B64D 43/00; G02B 26/02; G06T 2207/30204; G06T 2207/30268;
(Continued)

(56) References Cited

U.S. PATENT DOCUMENTS 7,095,002 B2 * 8/2006 Kong ................. H05B 37/0227
250/205
7,515,822 B2 4/2009 Keam
(Continued)

FOREIGN PATENT DOCUMENTS

EP 1 715 407 A2 10/2006
WO WO 2014-103223 A1 7/2014

OTHER PUBLICATIONS

International Search Report and Written Opinion of International Patent Application No. PCT/US2016/020462 dated May 11, 2016.
(Continued)

*Primary Examiner* — Peter D Le
(74) *Attorney, Agent, or Firm* — Arent Fox LLP (57) ABSTRACT

An apparatus, system, and method for dual mode imaging under different lighting conditions. A sensor is configured to image a target. A dual-mode illumination source is configured to illuminate the target while the sensor images the target. The dual-mode illumination source is configured to illuminate the target using a first wavelength of light under a first lighting condition and to illuminate the target using a second wavelength of light under a second lighting condition. The system may be used in an optical tracking system to track the motion of an object.

21 Claims, 6 Drawing Sheets

(51) Int. Cl.
*H04N 5/225* (2006.01)
*H04N 5/33* (2006.01)

(52) U.S. Cl.
CPC ......... *H04N 5/2351* (2013.01); *H04N 5/2353* (2013.01); *H04N 5/2354* (2013.01); *H04N 5/33* (2013.01); *H04N 5/332* (2013.01); *G06T 2207/30204* (2013.01); *G06T 2207/30268* (2013.01)

(58) Field of Classification Search
CPC .. H04N 5/2256; H04N 5/2351; H04N 5/2352; H04N 5/2353; H04N 5/2354; H04N 5/33; H04N 5/332
See application file for complete search history.

(56) References Cited

U.S. PATENT DOCUMENTS

| | | |
|---|---|---|
| 8,077,914 B1 | 12/2011 | Kaplan |
| 2003/0067537 A1* | 4/2003 | Myers ................ G01B 11/2509 348/47 |
| 2003/0093805 A1* | 5/2003 | Gin .................. G08B 13/19619 725/105 |
| 2003/0095293 A1* | 5/2003 | Wada .................... G06T 3/4007 358/487 |
| 2005/0133693 A1 | 6/2005 | Fouquet et al. |
| 2006/0232780 A1 | 10/2006 | King |
| 2006/0238492 A1* | 10/2006 | Fouquet ................ G06F 3/0312 345/156 |
| 2007/0296688 A1 | 12/2007 | Nakamura et al. |
| 2008/0186449 A1 | 8/2008 | Sur et al. |
| 2008/0239091 A1* | 10/2008 | Soga ...................... H04N 5/217 348/222.1 |
| 2009/0050807 A1* | 2/2009 | Ota ...................... H04N 5/2354 250/338.1 |
| 2010/0302428 A1* | 12/2010 | Toyoda .................... G03B 7/28 348/333.01 |
| 2012/0062989 A1 | 3/2012 | Nelson et al. |
| 2012/0188354 A1 | 7/2012 | Munro et al. |
| 2013/0201563 A1* | 8/2013 | Nunnink ................ G02B 27/14 359/618 |
| 2014/0028861 A1 | 1/2014 | Holz |
| 2015/0238087 A1* | 8/2015 | Yamashita ............. A61B 5/024 600/473 |
| 2015/0350572 A1 | 12/2015 | Hattori et al. |
| 2016/0001328 A1* | 1/2016 | Hermle .................. B07C 5/363 209/577 |

OTHER PUBLICATIONS

Extended European Search Report of European Patent Application No. 16765413.6 dated Sep. 26, 2018.

* cited by examiner

DUAL-MODE ILLUMINATOR FOR IMAGING UNDER DIFFERENT LIGHTING CONDITIONS

CROSS-REFERENCE TO RELATED APPLICATION

This application claims the benefit of U.S. Provisional Application Ser. No. 62/133,138, entitled "DUAL-MODE ILLUMINATOR FOR IMAGING UNDER DIFFERENT LIGHTING CONDITIONS" and filed on Mar. 13, 2015, which is expressly incorporated by reference herein in its entirety.

BACKGROUND

Field

The present disclosure relates generally to dual mode imaging under different lighting conditions, e.g., for use in optical tracking.

Background

Optical tracking, for example, involving imaging of fiducials or targets is challenging when lighting conditions differ. For example, it is difficult for an imaging system to accurately image targets throughout the day when lighting conditions change between daylight and night.

SUMMARY

Optical tracking may involve capturing an image of passive targets, such as fiducials, in order to determine a location of a moving object. For example, a camera or other sensor may be used to image the targets. At times, the camera may need illumination in order to accurately image the targets. Ambient lighting conditions can vary, and illumination that is appropriate under one lighting condition may be unhelpful or problematic under a different lighting condition.

In light of these problems and unmet needs, the present disclosure provides a system, method, and apparatus that provides dual mode imaging of sensors under different lighting conditions. The aspects presented herein may be used, e.g., as part of an optical tracking system. Aspects presented herein include a dual-mode illumination source that illuminates reference targets while a sensor images the targets using at least two different wavelengths of light. The dual-mode illumination source may use the two different wavelengths in combination with an appropriate exposure time for imaging the targets in different lighting conditions. A narrow band passband filter, for example, may be used with the sensor and dual-mode illumination source.

Additional advantages and novel features of these aspects will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of motion tracking systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Dual-Mode Illuminator

Optical tracking may involve capturing an image of passive targets, such as fiducials, in order to determine a location of a moving object. For example, a camera or other sensor may be used to image the targets. At times, the camera/sensor may need illumination in order to image the targets. Ambient lighting conditions can vary, and illumination that is appropriate under one lighting condition may be unhelpful or problematic under a different lighting condition.

For example, direct sunlight may make it difficult to image such targets. When the targets are placed on a canopy of a cockpit, direct sunlight may shine through the canopy behind the targets and interfere with capturing an accurate image of certain targets. At nighttime, a different problem occurs, because illumination may be needed to detect passive targets that do not emit light themselves. Illumination of the targets may be provided to help the sensor detect the targets both in sunlight and in darker conditions. Additionally, such illumination may need to be compatible with NVIS equipment so that it is invisible or undetected by such equipment. The wavelength range that avoids interference with NVIS equipment is near the edge of the spectral response curve of an ordinary silicon image sensor. This characteristic makes it very difficult to illuminate a target brightly enough to obtain a quality image in sunlight during daytime operation. Aspects presented herein solve such challenges by providing a dual mode illuminator that illuminates the targets using different wavelengths under different lighting conditions.

Figure 1:
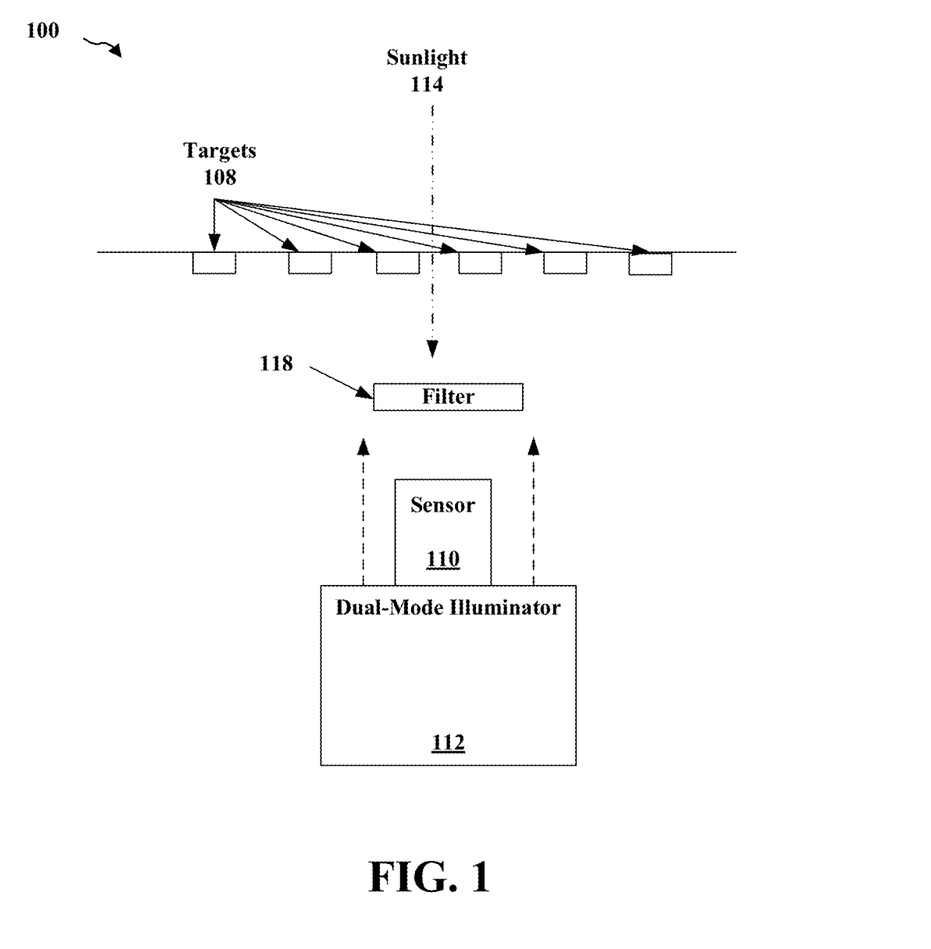
FIG. 1 illustrates an example apparatus having a dual-mode illuminator in accordance with aspects of the present invention.

FIG. 1 illustrates an example apparatus 100 for dual-mode imaging under different lighting conditions. The apparatus may be used, e.g., in connection with tracking an object. The apparatus includes a sensor 110 configured to image at least one target 108. For example, the sensor may comprise a camera that captures an image of the targets in order to track movement of the object. Among others, such a camera may comprise a complementary metal-oxide-semiconductor (CMOS) imager, such as a CMOS global shutter imager. A lens, such as a fish eye lens, may also be used in combination with such an imager. This can be helpful in circumstances when the sensor is positioned very near to the targets.

The apparatus also includes a dual-mode illumination source 112 configured to illuminate the targets 108 while the sensor 110 images the target. The dual-mode illumination source may be configured to illuminate the target using a first wavelength of light under a first lighting condition and to illuminate the target using a second wavelength of light under a second lighting condition.

For example, the illuminator 112 may emit the first wavelength of light when ambient light is meets or is above a threshold level, such as during daylight, and emit the second wavelength of light when the ambient light falls below the threshold level, such as during darker or nighttime conditions. The illuminator 112 may comprise at least one LED. The illuminator 112 may comprise two different emitters, a first emitter that emits light at the first wavelength and a second emitter that emits light at the second wavelength. The daytime illumination may be provided, e.g., by at least one LED. The nighttime illumination may be provided by, e.g., a vertical cavity surface emitting laser (VCSEL) emitter, laser diodes, LEDs, etc. Such emitters may operate in the UV range or in certain parts of the visible spectrum where NVGs are not sensitive.

The illuminator 112 may flash or otherwise periodically emit light to illuminate the targets for imaging. Alternately, the illuminator may constantly emit one of the two wavelengths, depending on the ambient light conditions.

Under daylight conditions, it may be important that the illuminator emit light within a part of the spectrum that the tracking camera, e.g., sensor 110, is able to efficiently detect. The selection of an appropriate wavelength for the illuminator may be used in combination with adjusting an exposure time of the camera. For example, a reduced exposure time may limit the effects of direct sunlight 114 on the image of the targets. The exposure time under brighter lighting conditions may be reduced in comparison to the exposure time under darker lighting conditions. For example, the exposure time may be lowered from a lowest usable setting of, e.g., 1 millisecond to well below 50 microseconds in order to reject a satisfactory amount of sunlight. Under daylight conditions, the exposure time may be, for example, in the range of approximately 15 µs to 150 µs. This may provide both sunlight readability and NVG-compatibility with a unique illuminator design. The exposure time may be adjusted based on an amount of ambient light that is detected. A reduced exposure time may be used when the ambient light is detected to meet a threshold.

In one example, the light source for daytime illumination may be selected to be invisible to the human eye. For example, the wavelength may be an infrared wavelength. However, a visible wavelength may also be used. The wavelength used during daylight conditions may be approximately in the range of 700 to 1000 nm, e.g., approximately 850 nm.

In contrast, the night mode illumination wavelength may be selected to be outside of the range of NVGs, for which sensitivity typically drops to near zero by 940 nm. Thus, the night mode illumination wavelength may be above approximately 940 nm, e.g., approximately 980 nm. In one example, a VCSELS emitter may be used. A dual-wavelength illuminator that uses an NVIS-compatible wavelength may be used at night, for example.

In darker conditions, the NVIS-compatible wavelength may be used, along with a longer exposure time than would be suitable under daylight conditions. For example, the longer exposure time might not completely reject sunlight. The nighttime exposure may be within a range of approximately 500 µs to 2000 µs. During the daytime, a more easily detectable wavelength may be used, which does not need to be NVIS-compatible. The more easily detectable wavelength may then be imaged using an ultra-short exposure that rejects most sunlight interference. The longer exposure time may be used when the ambient light is detected to meet or fall below a threshold.

For example, sun rejection may be achieved at 850 nm using a reasonable number of LEDs, but such LEDs may not be NVG compatible. Using 980 nm VCSELs may provide NVG compatibility, but may not provide enough optical power to meet the short exposure time needed to reject sunlight. Thus, in one example, an LED emitter having a wavelength of 850 nm may be used for the daytime mode, while a VCSELS emitter having a wavelength of approximately 950 nm may be used for the night mode.

In order to further address the problem of target readability in direct sunlight, imaging of the targets may be improved by using an interference filter 118 having passbands corresponding to the two wavelengths. The filter may be positioned, e.g., between the targets and the sensor, such as between a lens and the sensor. In the example using 850 nm wavelength for daytime illumination and 980 nm for nighttime illumination, an interference filter having two narrow passbands at 850 nm and 980 nm may be used, for example. This example is used to show the use of two passbands. Different wavelengths may be used.

Such a dual-mode illuminator provides sufficient illumination for passive fiducial markers under different lighting conditions, e.g., under both daylight and nighttime conditions.

The targets 108 used in connection with the dual-mode imaging apparatus may be configured to become brighter proportionally when backlit by the sun. For example, for optical tracking in connection with an aircraft, the sensor 110 may be directed toward the canopy of the aircraft. Thus, at times, the targets may be backlit by the sun, making it difficult to accurately image the targets. The dual-mode illuminator enables the targets to be accurately detected whether backlit by sunlight 114 or under darker lighting conditions.

As an additional option, retro-reflective stickers may be used for the fiducials on the canopy in order to overcome the inverse square loss from diffuse fiducials and return as much of the illumination to the lens as possible. With such a fiducial design, the fiducials can be illuminated with NVG-compatible wavelengths in order to obtain a high read rate throughout most of the 140 degree FOV.

Figure 2:
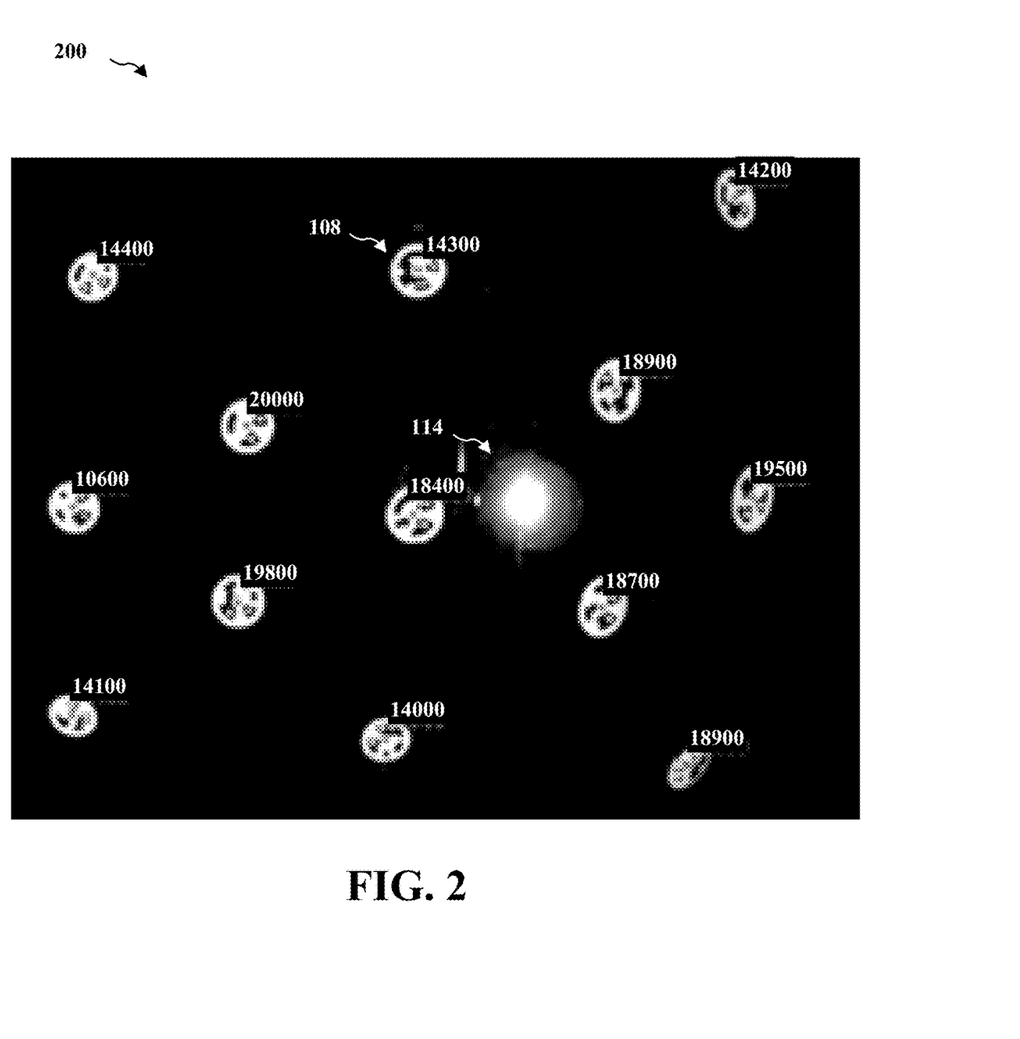
FIG. 2 illustrates an example image of fiducials having the sun directly behind them, for use in accordance with aspects of the present invention.

FIG. 2 illustrates an example optical sensor image 200 of fiducials 108 having the sun 114 directly behind them, the image taken using the dual mode illuminator under daylight conditions. Each fiducial is illustrated with an identifier number next to it. This figure illustrates the sunlight rejection capability of an image taken using the dual mode illuminator. The combination of more efficient wavelength for daytime illumination, and tighter band pass filtration and a shorter exposure period, reduces the effect of direct sunlight 114 on the image. The image in FIG. 10 is taken through a HObIT optical sensor of a fiducial constellation mounted to clear plastic, with the sun shining directly into the sensor lens. In FIG. 2, all fiducials are clearly recognized, while light 114 from the sun has been reduced to a dot about the size of a fiducial 108. If the sun were imaged adjacent to a fiducial, that fiducial would no longer be recognized. However, as illustrated by FIG. 2, not more than one fiducial may be obscured by the sun at a time. Therefore, an image of a constellation of multiple fiducials, such as illustrated in FIG. 2, is less affected by sunlight interference. The image and identification of other fiducials in the image can be used to detect a position of the camera.

Figure 3:
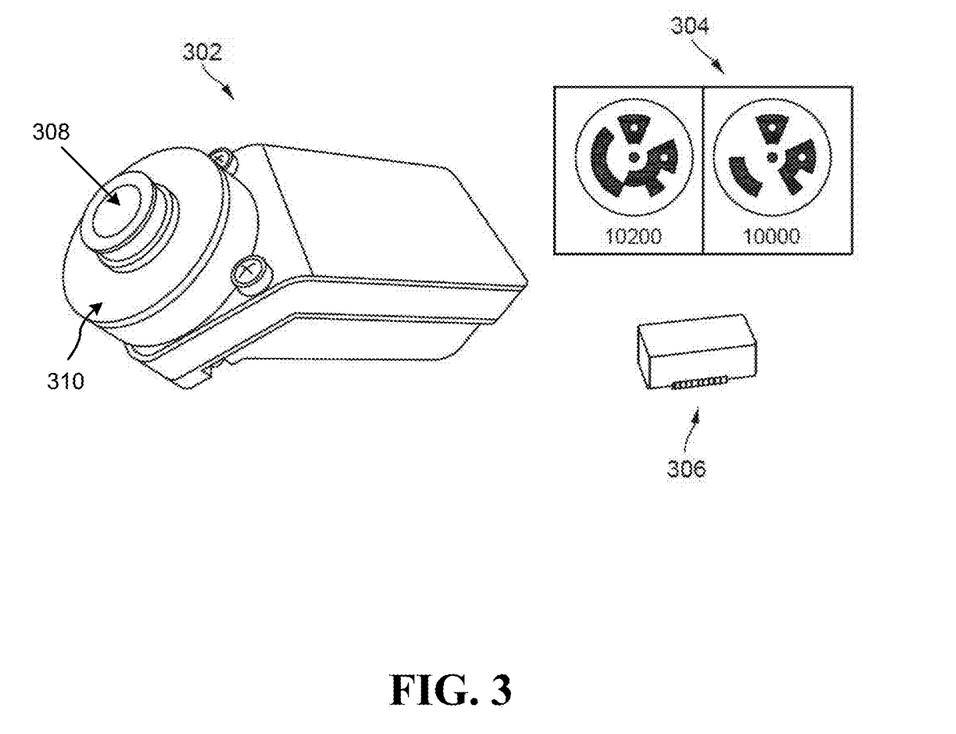
FIG. 3 illustrates example tracking components, in accordance with aspects of the present invention.

FIG. 3 illustrates example dual-mode illumination components that may be used, e.g., in an optical tracker. FIG. 3 illustrates a camera 302 that can be used as a sensor to image targets 304. An inertial measurement unit (IMU) 306 may also be used to track motion of an object, in accordance with aspects of the present invention. By illuminating retro-reflective targets directly, the problems caused by ambient lighting such as shadows or sub-optimal exposures can be avoided. In one example, the dual mode-illumination source may be configured to surround the camera 302. In the example illustrated in FIG. 3, the camera includes an opening 308 through which the targets are imaged. FIG. 3 illustrates the opening 308 as a rounded opening. The dual-mode illuminator 310 may be positioned around the rounded opening. 308. In another example, a dual-mode illuminator may be placed in a different position relative to the camera.

Figure 4:
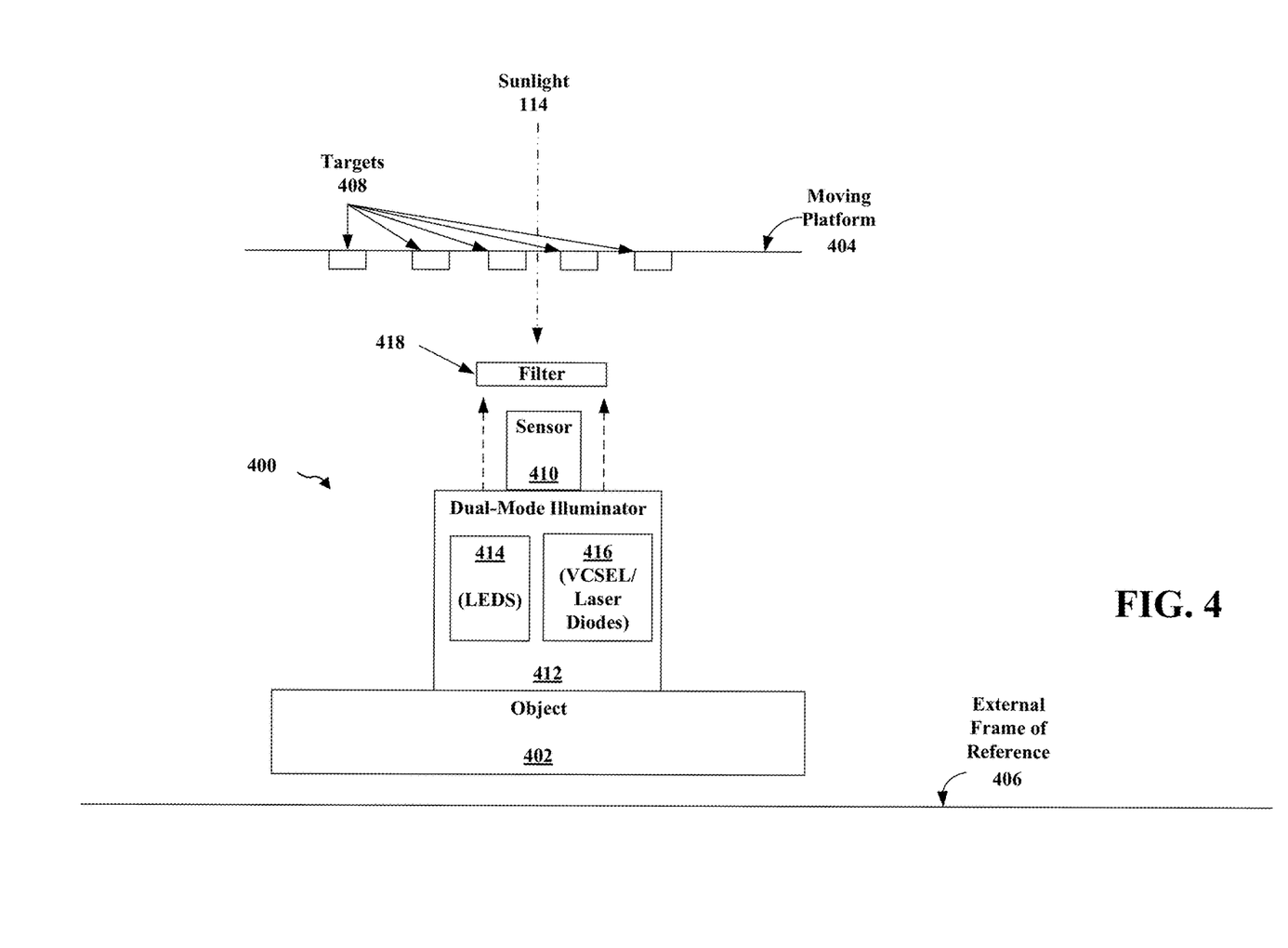
FIG. 4 illustrates an example of an object tracking system having a dual-mode illuminator for use in accordance with aspects of the present invention.

In one example, the aspects presented herein may be used in connection with a tracking system that tracks movement of an object. FIG. 4 illustrates a tracking system 400 for tracking an object 402 moving relative to a moving platform 404.

As illustrated in FIG. 4, the object 402 and moving platform may also be moving relative to an external frame of reference 406. The external frame of reference 406 may be a fixed frame of reference, e.g., the Earth, and the moving platform 404 may be a moving vehicle with which the object 402 is moving, such as an airplane or other vehicle. The object may be a user display that moves relative to the vehicle. For example, the moving object may be a head mounted display (HMD) and the moving platform may be a vehicle such as an aircraft.

Reference targets 408, such as reflective fiducials, may be fixed to the moving platform 404. In the example of an aircraft, the fiducials may be fixed to the canopy of the aircraft. The tracking system 400 may include at least one sensor 410 imaging the targets 408 in order to track movement of the object 402 relative to the moving platform 404. In one example, fiducials may be fixed to a canopy of an aircraft, and the object may comprise a HMD.

The apparatus includes a sensor 410 configured to image at least one target 408. Although not illustrated, a lens, such as a fish eye lens, may also be used in combination with such an imager 410. This can be helpful in circumstances when the sensor is positioned very near to the targets.

Optics for aircraft applications may require a very wide field fisheye lens, e.g., because the camera is only about 5-10 cm from the aircraft canopy. Good clear imaging may be required at close range, e.g., throughout a 140 FOV. Because the camera faces in the direction of the aircraft canopy, the sun can be directly in the FOV of the camera, which makes for some very difficult dynamic range problems. In order to address the potential challenges caused by the camera being directed toward the canopy, fiducials 408 may be configured to become proportionally brighter when backlit by the sun. In order to use such fiducials at night an illuminator may be added.

Thus, the apparatus may also include a dual-mode illumination source 412 configured to illuminate the targets 408 while the sensor 410 images the target, the illumination source 412 using at least two different wavelengths of light. The sensor 410, targets 408, and dual-mode illumination source 412 may be similar to those described in connection with FIGS. 1-3.

For example, the illuminator 412 may comprise two different emitters, a first emitter 414 that emits light at the first wavelength and a second emitter 416 that emits light at the second wavelength. The daytime illumination may be provided, e.g., by at least one LED. The nighttime illumination may be provided by, e.g., a vertical cavity surface emitting laser (VCSEL) emitter, laser diodes, LEDs, etc. Such emitters may operate in the UV range or in certain parts of the visible spectrum where the NVGs are not sensitive. One of the two different emitters can be used to illuminate the target(s) 408 depending on whether ambient light meets a threshold.

Figure 5:
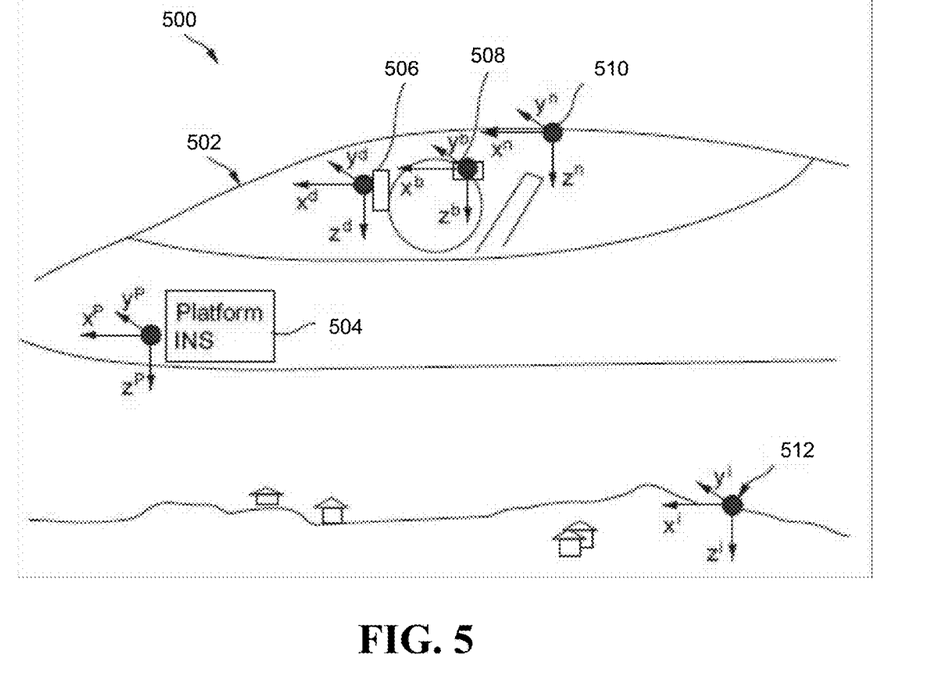
FIG. 5 illustrates an example of a fighter jet cockpit with coordinate axes associated with a vehicle tracking system, in accordance with aspects of the present invention.

FIG. 5 illustrates an example of a fighter jet cockpit 500 having a target(s) 510 positioned on the canopy 502. FIG. 5 illustrates example coordinate axes associated with the platform INS (p) 504, the display (d) 506, the sensor body (b) 508, the fiducial constellation (n) 510 and the ground (i) 512 in accordance with aspects of the present invention. Table 1 lists the five associated coordinate frames.

TABLE 1

| | |
|---|---|
| i-frame | The i-frame is an inertial reference frame, and may be, e.g., a local-level North-East-Down (NED) frame on the ground below the aircraft that rotates sufficiently slowly to be considered an inertial frame. |
| p-frame | The aircraft "platform INS" frame. The "platform INS" is the inertial navigation system that supplies pose data to the mission computer (MC) and in turn to the display system. |
| n-frame | The reference frame of the tracking system. For a magnetic tracker the n-frame may have its origin in and axes nominally aligned with a source coil assembly. In one example, the n-frame may have its origin at one of the fiducials and its axes may be roughly aligned to the aircraft axes during ground harmonization procedures. |
| b-frame | The body frame of the tracker sensor. In one example, the b-frame may be defined by a NavChip inside the sensor assembly, which may be mounted upside-down, backwards and/or tilted relative to the helmet. |
| d-frame | Display frame defined by the lightguide optical element (LOE) or "paddle" on the display pod. |

Figure 6:
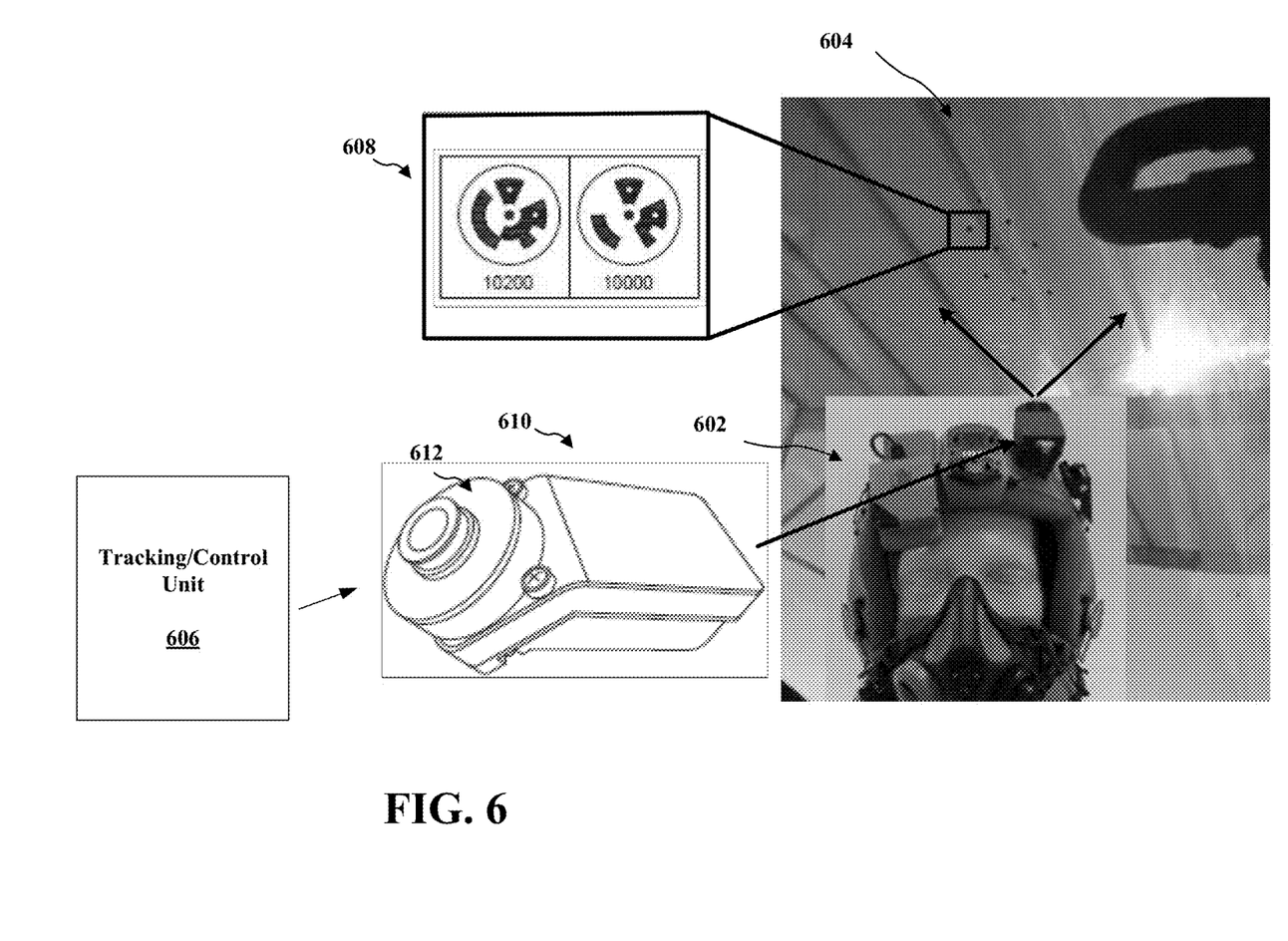
FIG. 6 illustrates an example apparatus having a dual-mode illuminator in accordance with aspects of the present invention.

FIG. 6 illustrates an example tracking apparatus in accordance with aspects of the present invention. In the example of FIG. 6, motion of a HMD 602 is tracked relative to an aircraft. Reflective fiducials 608 are placed as targets on the canopy 604 of the aircraft above the pilot's head. A camera 610 is coupled to the HMD to image the fiducials 608 as an aspect of tracking motion of the HMD. A dual-illumination source 612 is provided near the sensor and generally directed toward the fiducials. Fiducials 608, camera 610, and the dual-illumination source 612 may be similar to those discussed in connection with FIGS. 1-4. The camera and/or illuminator may be controlled by a control unit 606. The control unit may include memory and at least one processor configured to control the operation of the camera and/or illuminator as described herein. For example, the control unit may control the exposure time used by the camera or sensor. The control unit may receive information regarding an amount of ambient light that is detected and may control the exposure time based on the detected amount of ambient light and a first threshold. The control unit may control the wavelength of light emitted by the illumination source based on the detected amount of ambient light and a second threshold. The first threshold and the second threshold may be the same and may be different.

For optical pose recovery, a CMOS global shutter SXGA (1280×1024) imager may be used as the camera 610. The camera 610 may be combined with a 150° (±75°) field of view fish-eye lens. Optical distortion compensation in such a tracking system, for example, allows off axis fiducial recognition up to ±70°. The sensor provides sensitivity at wavelengths beyond 940 nm. The illuminator operates at wavelengths beyond the NVG sensitive range thereby making it both NVG compatible and eye safe.

The fiducials may range in size from approximately 6 mm to 25 mm for airborne applications. Distance from the sensor to the fiducials determines the size needed. Tactical applications may use, among others, 8 mm fiducials. Fiducials of different sizes can be used when the ceiling is irregular. The fiducials themselves may be, e.g., MIL-810 qualified for sunlight resistance, for use with high humidity, temperature, and temperature shock, and for cleaning fluid resistance. The base material used may comprise retroreflector, such as that designed for road signs.

Potential Applications

The aspects presented herein may be used in connection with the motion tracking described in U.S. Pat. No. 6,474, 159, titled "Motion Tracking," which issued on Nov. 5, 2002, and in U.S. Provisional Application No. 61/988,106, titled "Improved Registration for Vehicular Augmented Reality Using Auto-Harmonization," filed on May 2, 2014, and corresponding application Ser. No. 14/702,402, published as US 2015/0317838 A1, the entire contents of each of which are incorporated herein by reference.

There are compelling applications for AR in various kinds of aircraft and ground vehicles as well. In fact, the very earliest head-tracked see-through HMDs were used on aircraft decades before the term "AR" was coined. Additional details are described in Furness, T. A. (1986). The Super Cockpit and Human Factors Challenges. In Ung, M. *Proceedings of Human Factors Society* 30*th Annual Meeting*, pp. 48-52, the entire contents of which are incorporated herein by reference. Vision-based tracking on vehicles presents very different challenges than for normal ground-based AR. The immediate visual surroundings are the interior of the vehicle, where use of markers may be perfectly practical. However, these markers (or any other visual features in the vehicle) are moving relative to the world frame where augmentations need to be stabilized, thus requiring careful engineering to track the vehicle, and the head relative to the vehicle, and combine it all with sufficient accuracy to achieve.

A variety of head-trackers that were in use on airplanes prior to 1991, e.g., which were mostly mechanical, optical and magnetic, are described in F. Ferrin, "Survey of helmet tracking technologies", SPIE, vol. 1456, pp 86-94, 1991, the entire contents of which are incorporated herein by reference. A hybrid inertial helmet tracker for aircraft is described in Foxlin, E. Head-tracking relative to a moving vehicle or simulator platform using differential inertial sensors. *Proceedings of Helmet and Head-Mounted Displays V*, SPIE Vol. 4021, AeroSense Symposium, Orlando, Fla., Apr. 24-25, 2000, the entire contents of which are incorporated herein by reference. An additional aspects, including inside-outside-in optical are described in Foxlin, E., Altshuler, Y., Naimark, L., & Harrington, M. FlightTracker: A Novel Optical/Inertial Tracker for Cockpit Enhanced Vision. *IEEE/ACM International Symposium on Mixed and Augmented Reality* (Washington, D.C., ISMAR 2004), Nov. 2-5, 2004; Foxlin, E. & Naimark, L. (2003). VIS-Tracker: A Wearable Vision-Inertial Self-Tracker. *IEEE Conference on Virtual Reality* (Los Angeles, Calif., 2003); and Atac, R. & Foxlin, E. Scorpion hybrid optical-based inertial tracker (HObIT). Proc. SPIE 8735, *Head-and Helmet-Mounted Displays XVIII: Design and Applications,* 873502, May 16, 2013, the entire contents of which are incorporated herein by reference.

Aspects of the apparatus, system and method presented herein are compatible with various vehicles, including both military and civilian aircraft. In order to be compatible with, e.g., different mission computers (MC) that may already be present in aircraft, a display system in accordance with aspects of the present invention may implement only the generic head-tracking, rendering and display functions that are common to all vehicular AR systems, and none of the mission-specific functions such as targeting, cueing, enhanced vision or synthetic vision. As such a system would be responsible for rendering, but doesn't decide what is to be rendered, the interface to the MC allows the MC to define and download an arbitrary set of "symbols" including any 2D or 3D shapes involving line segments of any color or thickness and/or bitmaps. Each symbol may be specified by the MC to be ground-stabilized or head-stabilized or vehicle-stabilized.

For example, an example AR system may include a HMD that includes a tracking component and a display. A control unit and image generator receives tracking data relating to the HMD and communicates a generated image to the HMD. Control unit may also receive input from a vehicle's mission computer, including, e.g., symbol data and data from an aircraft GPS/INS.

Aspects presented herein may include replacing a magnetic tracker so that the system involves no cockpit-installed active devices (such as a magnetic source or optical cameras). Instead, all the inertial and optical sensors may be provided in a self-contained sensor mounted, e.g., on the helmet. The sensor may communicate with a control unit, such as a cockpit mounted control unit, through a Helmet-Vehicle Interface (HVI). The sensor may communicate with the control unit, e.g., using the same HVI cable as the display pod. Fiducial stickers may be placed on the canopy over the pilot or driver's head to assist in the motion tracking.

In addition to aircraft, there are a number of potential applications for the motion tracking aspects presented herein. For example, AR applications in ground vehicles. In climates like Alaska that receive large amounts of snow, the snow piles may become so high that drivers of snow ploughs cannot see the tops of the roadside guidance poles. In this circumstance, an AR system can be used to guide the plow drivers.

Another possibility is AR guidance for operators of earth-moving equipment and other heavy construction machinery in order to help them more efficiently and exactly achieve the desired results planned in a CAD model. AR headsets would also be valuable to provide situational awareness to first responders while they drive to the scene, and after they dismount from the vehicles at the scene.

The aspects presented herein improve motion tracking on these types of vehicles by improving the accuracy of the images of fiducials.

Aspects presented herein address the challenges including optical technologies to produce small comfortable HMDs with sufficient field of view (FOV), and head-tracking that can produce convincing spatio-temporal registration of augmentations to their corresponding physical objects in unprepared real-world environments. Additional details can be found in Azuma, R., and Bishop, G., "Improving Static and Dynamic Registration in a See-Through HMD", Proceedings of SIGGRAPH 37 '94. In Computer Graphics, Annual Conference Series, Orlando, Fla., pp. 197-204, 1994; Krevelen, D. W. F., & Poelman, R. A Survey of Augmented Reality Technologies, Applications and Limitations. *The International Journal of Virtual Reality*, 9(2):1-20, 2010; Daniel Wagner, Gerhard Reitmayr, Alessandro Mulloni, Tom Drummond, Dieter Schmalstieg. Pose tracking from natural features on mobile phones. *Proceedings of the 7th IEEE/ACM International Symposium on Mixed and Augmented Reality*, pages 125-134. ISMAR 2008; Welch, G., Bishop, G., Vicci, L., Brumback, S., Keller, K. & Colluci, D. (2001). High-Performance Wide-Area Optical Tracking: The HiBall Tracking System. Presence: Teleoperators and Virtual Environments vol 10, issue 1, MIT Press; and Zhou, F., Been-Lirn Duh, Henry., Billinghurst, M. Trends in augmented reality tracking, interaction and display: A review of ten years of ISMAR. *Proceedings of the 7th IEEE/ACM International Symposium on Mixed and Augmented Reality*, Pages 193-202. ISMAR 2008; and Roberts, D., Menozzi, A., Cook, J., Sherrill, T., Snarski, S., Russler, P., . . . & Welch, G. Testing and evaluation of a wearable augmented reality system for natural outdoor environments. In SPIE defense, Security, and Sensing (pp. 87350A-87350A). International Society for Optics and Photonics. May 2013, the entire contents of each of which are incorporated herein by reference.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for dual mode imaging under different lighting conditions, the apparatus comprising:
   a sensor configured to image a target; and
   a dual-mode illumination source that emits a first, infrared wavelength of light or a second wavelength of light in a direction of the target while the sensor images the target, wherein the dual-mode illumination source is configured to illuminate the target using the first, infrared wavelength of light under a first lighting condition and to illuminate the target using the second wavelength of light under a second lighting condition having less ambient light than the first lighting condition.

2. The apparatus of claim 1, wherein the dual-mode illumination source emits the first, infrared wavelength of light when ambient light is above a threshold level of ambient light and emits the second wavelength of light when the ambient light is below threshold level of ambient light.

3. The apparatus of claim 2, wherein the sensor images the target using a first exposure time when the target is illuminated using the first, infrared wavelength of light and uses a second exposure time when the target is illuminated using the second wavelength of light, the first exposure time being shorter than the second exposure time.

4. The apparatus of claim 3, wherein the first exposure time is approximately within a first range comprising 15 to 150 uS, and wherein the second exposure time is approximately within a second range comprising 500 to 2000 uS.

5. The apparatus of claim 2, wherein the first, infrared wavelength is within a range of approximately 850 nm and wherein the second wavelength is above approximately 940 nm.

6. The apparatus of claim 5, wherein the first, infrared wavelength comprises approximately 850 nm and the second wavelength comprises approximately 980 nm.

7. The apparatus of claim 1, wherein the dual-mode illumination source emits the first, infrared wavelength of light during daylight conditions and emits the second wavelength of light during nighttime conditions.

8. The apparatus of claim 1, further comprising:
an interference filter positioned between the sensor and the target, wherein the sensor and the dual-mode illumination source are positioned on a side of the interference filter opposite the target.

9. The apparatus of claim 8, wherein the interference filter comprises:
a narrow passband at approximately the first, infrared wavelength; and
a second narrow passband at approximately the second wavelength.

10. The apparatus of claim 1, wherein the dual-mode illumination source comprises:
a first emitter that emits light at the first, infrared wavelength; and
a second emitter that emits light at the second wavelength.

11. The apparatus of claim 1, wherein the first emitter comprises at least one LED.

12. The apparatus of claim 1, wherein the second emitter comprises at least one selected from a group consisting of a vertical cavity surface emitting laser (VCSEL) emitter, a laser diode, and a light emitting diode (LED).

13. The apparatus of claim 12, wherein the second emitter emits light in the ultraviolet range.

14. The apparatus of claim 12, wherein the second emitter emits light in the visible spectrum.

15. The apparatus of claim 1, wherein the dual-mode illumination source includes a plurality of emitters positioned around the sensor.

16. A dual mode imaging system for imaging a target under different lighting conditions, the apparatus comprising:
a target;
a sensor configured to image the target; and
a dual-mode illumination source configured to illuminate the target while the sensor images the target, wherein the dual-mode illumination source that emits a first, infrared wavelength of light or a second wavelength of light in a direction of the target using the first, infrared wavelength of light under a first lighting condition and to illuminate the target using the second wavelength of light under a second lighting condition having less ambient light than the first lighting condition.

17. The system of claim 16, wherein the target comprises a retro-reflective material.

18. The system of claim 16, wherein the target is positioned on a platform and the sensor is positioned on an object movable relative to the platform, the system further comprising:
a processor configured to track a position of the moving object relative to the platform based on the image of the target.

19. The system of claim 16, wherein the dual-mode illumination source emits the first, infrared wavelength of light when ambient light is above a threshold level of ambient light and emits the second wavelength of light when the ambient light is below the threshold level of ambient light.

20. The system of claim 19, wherein the sensor images the target using a first exposure time when the target is illuminated using the first, infrared wavelength of light and uses a second exposure time when the target is illuminated using the second wavelength of light, the first exposure time being shorter than the second exposure time.

21. The apparatus of claim 1, wherein the sensor comprises a single sensor configured to image the fiducial target under illumination of the first wavelength and under illumination of the second wavelength.

* * * * *